United States Patent [19]
Bailey et al.

[11] Patent Number: 4,664,966
[45] Date of Patent: May 12, 1987

[54] ENCLOSED-LENS RETROREFLECTIVE SHEETING HAVING TOUGH, WEATHER-RESISTANT, TRANSPARENT COVER FILM

[75] Inventors: Terry R. Bailey, Woodbury, Minn.; Dale H. Haunschild, Hudson, Wis.

[73] Assignee: Minnesota Mining and Manufacturing Company, St. Paul, Minn.

[21] Appl. No.: 799,100

[22] Filed: Nov. 18, 1985

[51] Int. Cl.⁴ ............................................. G02B 5/128
[52] U.S. Cl. ................................... 428/203; 428/204; 428/325; 428/913; 156/244.11
[58] Field of Search ............... 428/203, 204, 325, 913; 156/244.11

[56] References Cited

U.S. PATENT DOCUMENTS 2,407,680  3/1945  Palmquist et al. ...................... 88/82
4,511,210  4/1985  Tung et al. ........................... 350/105

Primary Examiner—Marion C. McCamish
Attorney, Agent, or Firm—Donald M. Sell; James A. Smith; Roger R. Tamte

[57] ABSTRACT

A transparent cover film better protects enclosed-lens retroreflective sheeting and can be applied more economically when it is extruded and is a thermoplastic polymer which has good elongation and minimal elastic memory. Preferred polymers are (a) aliphatic urethanes and (b) copolymers of ethylene or propylene.

16 Claims, 3 Drawing Figures

ENCLOSED-LENS RETROREFLECTIVE SHEETING HAVING TOUGH, WEATHER-RESISTANT, TRANSPARENT COVER FILM

FIELD OF THE INVENTION

The invention concerns enclosed-lens retroreflective sheeting which has a flat, transparent cover film and specifically concerns the transparent cover film.

BACKGROUND ART

An economical retroreflecting base material comprises substantially a monolayer of glass microspheres embedded in a polymeric binder layer, a specularly reflective layer covering the polymeric layer, and a pressure-sensitive adhesive layer by which the retroreflecting base material can be mounted onto a substrate such as a license plate blank. This composite is then dipped into a solution of resin which is allowed to harden to provide a transparent, weather-resistant cover film which brings the specularly reflective layer into proper focus. Although this dipping and hardening process is slow and labor-intensive, it is often used where labor costs are low, e.g., in prison industries.

When higher retroreflective brightness is desired, the retroreflecting base material may be made as illustrated in FIG. 6 of U.S. Pat. No. 4,511,210 (Tung et al.), which base material includes a monolayer of glass microspheres 21, a spacing layer 23, a specularly reflective layer 24, and a pressure-sensitive adhesive layer 25. After adhering this to a substrate, the composite may be dipped into a solution of resin to provide a transparent cover film as described above and mentioned in Example 4 of the Tung patent. Much faster production rates are realized if the cover film is preformed as in Example 1 of the Tung patent. Also, the use of a preformed transparent cover film avoids the pollution that would be created upon drying a solution. The cover film of that Example 1 is polymethylmethacrylate which functions well when the retroreflective sheeting has a rigid, flat support such as a highway sign. However, that material is not sufficiently extensible to withstand the stretching encountered in the embossing of a license plate or the application to irregular surfaces. Another preformed transparent cover film that has been used is biaxially oriented poly(ethylene terephthalate) film, but its high strength has inhibited its use in retroreflective sheeting which is to undergo stretching as in the embossing of a license plate. Also, those preformed transparent cover films have required a second pressure-sensitive adhesive layer, the need for which tends to defeat the economy of the retroreflective sheeting. Furthermore, the second pressure-sensitive adhesive layer lies in the optical path and may degrade, thus reducing the optical efficiency.

Because of the enclosed-lens nature of the above-described retroreflective sheetings, incident light rays are focused onto the specularly reflective layer irrespective of whether the front of the sheeting is wet or dry. This capability was first taught in U.S. Pat. No. 2,407,680 (Palmquist et al.), which discloses retroreflective sheeting that has been sold commercially for many years in large volume and to the general satisfaction of its users. In making retroreflective sheeting of the Palmquist patent, a transparent cover film is coated from solution, typically a thermoset resin such as an alkyd resin or an acrylic resin. However, to permit the retroreflective sheeting to be embossed, the cover film has been a thermoplastic resin such as plasticized polyvinyl chloride coated from solution.

DISCLOSURE OF INVENTION

The invention provides enclosed-lens retroreflective sheeting to which is strongly bonded a transparent cover film that (a) can be applied at fast production rates, (b) is sufficiently extensible to withstand substantial stretching such as the embossing of a license plate, (c) is sufficiently soft that when stretched to conform and adhere to an irregular surface, it resists localized delamination, (d) has good impact resistance, (e) should adequately protect against weathering and dirt, and (f) is inexpensive. Like the enclosed-lens retroreflective sheetings discussed above, that of the invention comprises retroreflecting base material which comprises substantially a monolayer of lenses (preferably glass microspheres) anchored in a binder layer, a specularly reflective layer underlying and spaced from the lenses by transparent material, and a weather-resistant transparent cover film. The novel retroreflective sheeting differs from those of the prior art in that its cover film comprises extruded, substantially thermoplastic polymer and has an elongation of at least 50% and a tensile relaxation force from 50% elongation after 5 minutes relaxation of no more than 2300 N/m width. Because only a small percentage of commercially available pressure-sensitive adhesives can withstand a tensile relaxation force of 2300 N/m width, that force preferably is less than 1000 N/m width and more preferably is less than 700 N/dm. Furthermore, a lower tensile relaxation force permits greater latitude in selecting materials for the novel retroreflective sheeting, because there is less need for concern about delamination due to the elastic memory of the cover film.

Greater elongation may be required for certain uses, e.g., to permit the retroreflective sheeting to stretch sufficiently to be applied to a traffic cone or to irregular surfaces such as sidewalls of various automotive vehicles. Good stretchability also is required when the novel retroreflective sheeting is to be embossed, e.g, when mounted on a license plate blank. To permit the blank to be embossed in a male/female die to a depth of 2.5 mm with no danger of cracking, the elongation of the cover film should be at least 100%, preferably at least 200%. Good stretchability is also required for use of the novel retroreflective sheeting in flexible traffic markers which must withstand repeated flexing under the tires of automotive vehicles.

Best results have been achieved when the substantially thermoplastic polymer has been selected from (a) one or more aliphatic urethanes or (b) one or more copolymers of monomers comprising by weight a major proportion of at least one of ethylene and propylene and a minor proportion of another monomer. The polymer should be of high molecular weight (HMW) as evidenced by a melt index no greater than 300 (ASTM Test Method D1238-79). Typically the HMW polymer has a weight average molecular weight of at least 60,000. Preferably its melt index is less than 100, more preferably less than 20, because polymers of lower indices are easier to extrude and have better resistance to softening at elevated temperatures.

A preferred HMW polymer is an aliphatic urethane polymer prepared from an aliphatic polyfunctional isocyanate and a polyfunctional hydroxyl-containing polymer, e.g., "Q-thane" 3429 of K. J. Quinn & Co., Inc.

Among other preferred HMW polymers are ethylene copolymers, a number of which are commercially available at reasonable cost, including

| Supplier | Designation | Comonomer | Weight % |
| --- | --- | --- | --- |
| Dow Chemical Co. | "Primacor" 1420 | acrylic acid | 9 |
| E. I. duPont | "Nucrel" 035 | methacrylic acid* | 20* |
| E. I. duPont | "Elvax" 240 | vinyl acetate | 28 |

*Total comonomer (believed to include a small proportion of vinyl acetate)

Ethylene copolymers based on lower percentages of these comonomers are also available, but do not adhere as well to the underlying retroreflective base material. Copolymers of ethylene and higher percentages of these comonomers may not be commercially available, but if available, they should adhere strongly to retroreflective material.

The substantially thermoplastic polymer may be a copolymer of monomers comprising by weight a major proportion of at least one of ethylene and propylene and a minor proportion of an acid-functional monomer such as acrylic acid or methacrylic acid, which copolymer has been crosslinked by cations such as zinc, sodium, or potassium. Zinc is preferred, because it affords good resistance to weathering. Such a crosslinked polymer is sometimes here called an "ionomeric copolymer". A preferred commercially available ionomeric ethylene copolymer is "Surlyn" 1706 from E. I. DuPont, a copolymer of by weight a major proportion of ethylene and a minor proportion of methacrylic acid ionically crosslinked with zinc ions.

There may be difficulty in bonding ionomeric copolymers to commonly used binder materials, but they bond well to nonionomeric polymers and especially well to the specific ethylene copolymers mentioned above. Hence, an ionomeric copolymer can be used as the outer layer of a dual-layer composite with the inner layer being a nonionomeric polymer. Moreover, an ionomeric copolymer provides better resistance to abrasion and dirt accumulation than does a nonionomeric copolymer, and it is believed that it also provides better weathering resistance.

The aforementioned dual-layer composite may be formed by coextrusion, or by extruding one layer onto the other, or by preforming both layers and bonding them to each other under heat and pressure. Preferably the composite is formed using a very smooth biaxially oriented poly(ethylene terephthalate) carrier web with the ionomeric layer in contact with the carrier web. The smooth carrier web affords a glossy surface to the composite.

Because ionomeric copolymers bond well to glass, they can be used as the sole cover film where the glass microspheres of the retroreflecting base material have only been partially embedded in the binder layer (such as in FIG. 6 of the Tung patent).

When the novel retroreflective sheeting employs an ethylene or propylene copolymer, whether or not the copolymer is ionomeric, it is believed that in order to provide good protection against both weathering and dirt, the ethylene or propylene should comprise a major proportion by weight of the monomers.

When the transparent cover film of the novel enclosed-lens retroreflective sheeting is an aliphatic urethane, better resistance to weathering and to dirt accumulation can be provided when the urethane is the inner layer of a dual-layer composite, the outer layer of which is a very thin film comprising an acrylic copolymer of monomers including methyl methacrylate and another acrylate or methacylate wherein methyl methacrylate comprises at least 20%, but not more than 90%, by weight of those monomers.

It may be desirable to apply over such an acrylic outer layer an exceedingly thin layer of substantially methylmethacrylate homopolymer to provide optimum resistance to weathering and dirt pickup.

When the substantially thermoplastic polymer of the transparent cover film comprises an ethylene or propylene copolymer, it may be desirable to apply to one or both of its surfaces, or to the surface of the retroreflecting base material, an adhesion-promoting treatment such as corona or plasma treatment or a thin polymeric layer. While an aliphatic urethane polymer may be more expensive than an ethylene or propylene copolymer, it adheres better to more materials and so is less likely to need any adhesion-promoting treatment. It may be desirable for the exposed layer of the cover film to receive an adhesion-promoting treatment, because purchasers of enclosed-lens retroreflective sheeting often apply over its outermost layer "lettering, symbols, designs, etc., by affixing thereto transparent colored films cut to the required shapes, or by painting with transparent colored paint; thereby forming an overlying transparent colored film or coating . . . which acts as a colored filter . . . " (U.S. Pat. No. 2,407,680, Palmquist et al.).

Also useful for the substantially thermoplastic polymer is extruded plasticized polyvinyl chloride, but it is less preferred since it is not highly weather resistant. It degrades in a hot, dry climate, especially in direct sunlight, but might be sufficiently durable where the weather is damper and/or cooler. Care should be taken to minimize degradation during the extrusion of the plasticized polyvinyl chloride.

Preferably the transparent cover film of the novel retroreflective sheeting or each layer thereof includes an ultraviolet absorber to protect the underlying retroreflecting base material from the degrading effect of ultraviolet radiation. The transparent cover film and any other layer may also include antioxidants or energy quenchers and colorants. In the retroreflecting base material, the transparent material which spaces the specularly reflective layer from the lenses preferably is substantially thermoset so that the application of heat and pressure to the novel retroreflective sheeting does not alter that spacing.

THE DRAWING

In the drawing, all figures of which are schematic:

Figure 1:
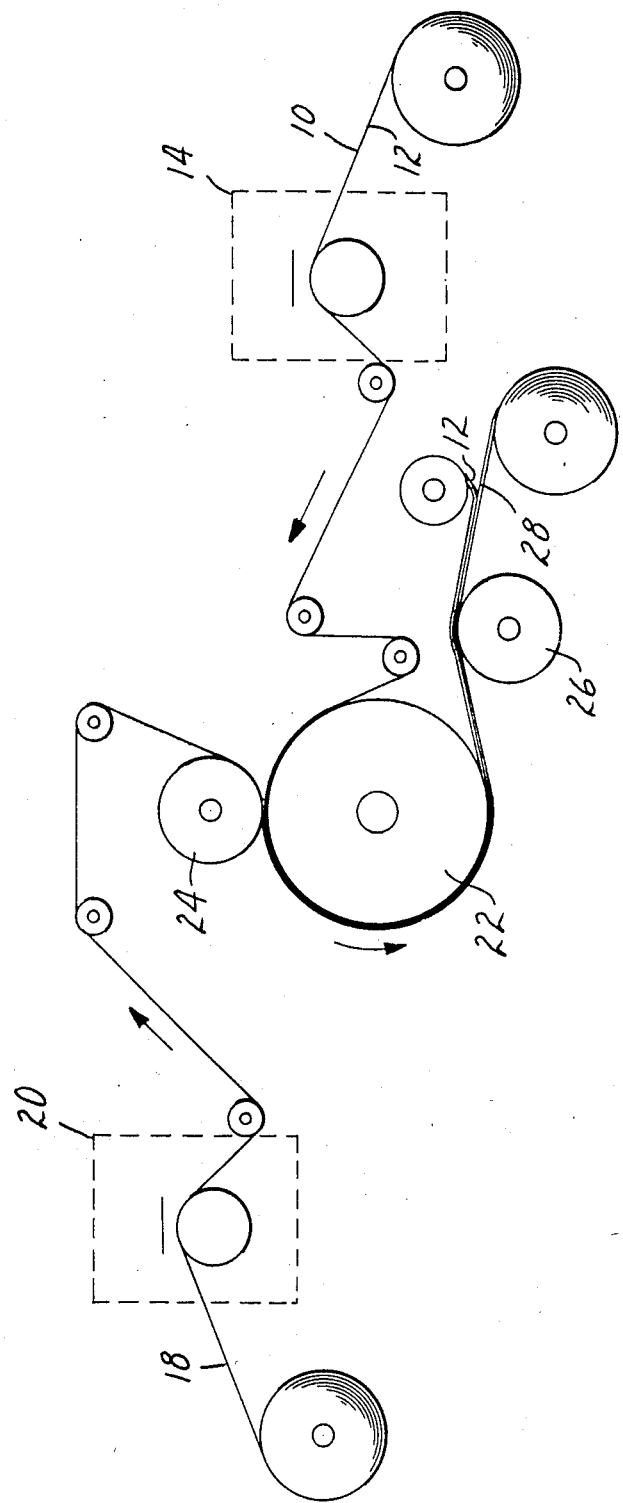
FIG. 1 illustrates a preferred method of making enclosed-lens retroreflective sheeting of the invention.

As shown in FIG. 1, a tough, weather-resistant, transparent cover film 10 on a dimensionally-stable carrier web 12 is drawn past a first corona treater 14 while retroreflecting base material 18 is drawn past a second corona treater 20. The transparent cover film and the base material 18 are drawn together into the nip between a hot can 22 and a rubber-covered pressure roll 24 to provide a composite which travels around the hot can, thus applying heat to the interface between the cover film 10 and base material 18 to insure a strong bond. After passing a chill roll 26, the carrier web 12 is stripped off, leaving a covered retroreflective sheeting 28 of the invention which is wound up into roll form for convenient storage and shipment.

Figure 2:
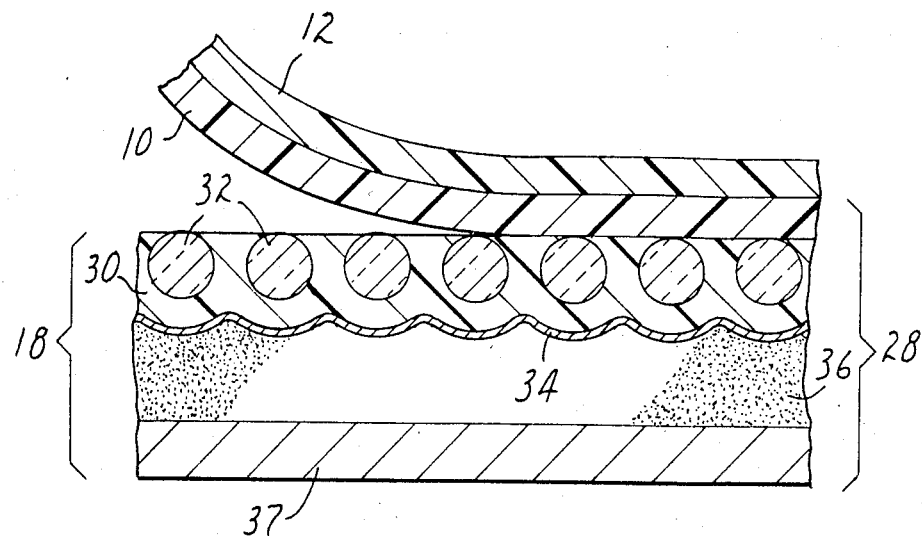
FIG. 2 shows the application of a transparent cover film by the method of FIG. 1 to provide enclosed-lens retroreflective sheeting of the invention.

The formation of the retroreflective sheeting 28 is schematically shown in FIG. 2. Its retroreflecting base material 18 has a binder layer 30 containing substantially a monolayer of glass microspheres 32, a specularly reflective layer 34, and an adhesive layer 36 which is covered by a removable paper liner 37.

Figure 3:
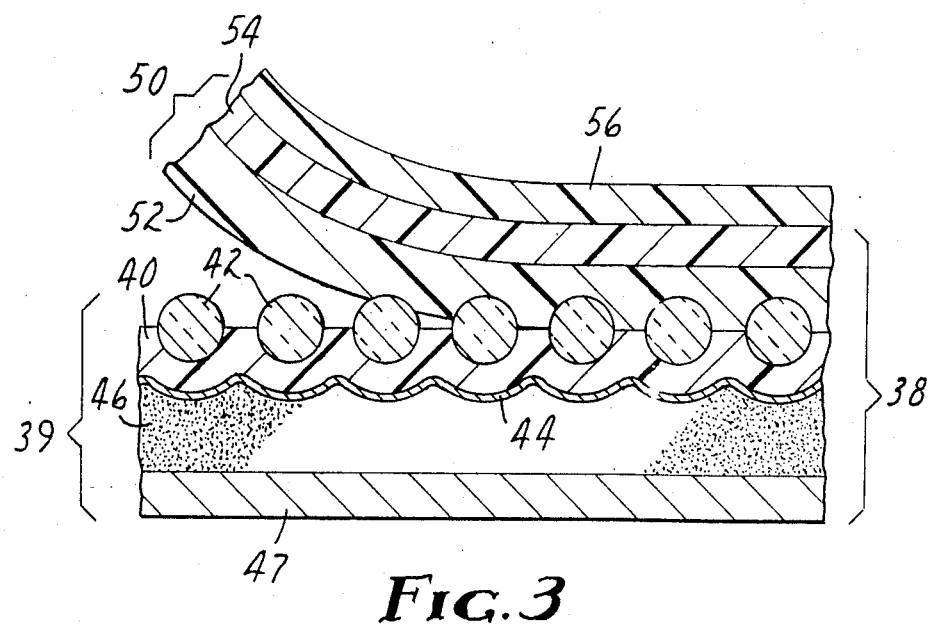
FIG. 3 shows the application of another transparent cover film to provide another retroreflective sheeting of the invention.

The retroreflective sheeting 38 shown in FIG. 3 consists of retroreflecting base material 39 which contains a binder layer 40, substantially a monolayer of glass microspheres 42, a specularly reflective layer 44, and an adhesive layer 46 covered by a removable liner 47. Its transparent cover film 50 consists of inner and outer layers 52 and 54, respectively. The cover film 50 is supported by a removable, dimensionally-stable carrier web 56.

In the following examples, all parts are by weight.

EXAMPLE 1

An extrusion-grade, thermoplastic HMW copolymer of 91 parts ethylene and 9 parts of acrylic acid ("Primacor" 1420 of Dow Chemical Co.) having a melt index of 3.0 was compounded with 3.6 parts a weathering stabilizer system consisting of 2 parts of a U.V. absorber, 1.5 parts of a hindered amine light stabilizer, and 0.1 part of an antioxidant. This stabilized ethylene acrylic acid (EAA) copolymer was extruded from a 6.3-cm extruder having a 40.6-cm die onto a biaxially oriented poly-(ethylene terephthalate) carrier web (herein called "PET carrier") using a barrier flighted screw with a 3:1 compression ratio. The extruder temperatures for zones 1 through 5 were 190°, 260°, 273°, 264°, and 264° C., respectively, while the neck and lips of the die were maintained at 270° C. The extruder speed was 30 rpm, and the film takeaway speed was 27.4 m/min. to provide a film caliper of about 50 micrometers. At these extruder conditions, the melt temperature of the stabilized EAA copolymer was measured to be 282° C.

The extruded EAA film was laminated as cover film 10 of FIG. 1 to retroreflecting base material 18 containing substantially a monolayer of glass microspheres having an average diameter of about 60 micrometers and a refractive index of 2.26 and being substantially fully embedded (as shown in FIG. 2) in the surface of a binder layer which comprised polyvinyl butyral resin crosslinked through its hydroxyl groups to a substantially thermoset state and also contained a plasticizer. Underlying and spaced from the microspheres by the same material was a specularly reflective layer of vapor-deposited aluminum having a thickness of about 100 nm. Covering the aluminum layer was a layer of pressure-sensitive adhesive having a thickness of about 20 micrometers. The adhesive layer was protected by a removable liner.

| Laminating conditions were: | |
| --- | --- |
| Each corona treater: | 2.4 kw/m width |
| Surface of hot can: | 150° C. |
| Hot can diameter: | 36 cm |
| Nip roll pressure: | 19 kg/cm width |
| Nip roll hardness: | 70 Shore A |
| Speed: | 4.9 m/min |
| Length of composite heating: | 53 cm. |

The resulting EAA-covered retroreflective sheeting of the invention was wound upon itself for storage.

EXAMPLE 2

Covered retroreflective sheeting was prepared as in Example 1 except that the stabilized EAA copolymer was coextruded with a HMW ionomeric copolymer, namely, a thermoplastic polymer containing interchain ionic bonds based on a zinc salt of ethylene methacrylic acid copolymer ("Surlyn" 1706 of E. I. duPont). The ionomeric copolymer had a melt index of 0.7 and was compounded with the same weathering stabilizer system as was the EAA copolymer. The EAA copolymer was extruded using a 6.3-cm extruder operated at 12 rpm. The ionomeric copolymer was extruded using a 3.2-cm extruder operated at 60 rpm. The die was an 86-cm, dual-manifold, flex-lip die, and the film takeaway speed was 8.2 m/min. These HMW polymers were coextruded with the ionomeric copolymer against a PET carrier, and each layer of the coextruded film had a thickness of about 25 micrometers. The EAA copolymer side was then laminated to the retroreflecting base material.

EXAMPLE 3

Covered retroreflective sheeting was prepared as in Example 1 except that the EAA transparent cover film 10 was replaced by a HMW polymer comprising a thermoplastic aliphatic urethane resin prepared from an aliphatic polyfunctional isocyanate and a polyfunctional hydroxyl-containing polymer, namely "Q-thane" P3429 of K. J. Quinn & Co., Inc., which is believed to be the reaction product of 1,1'-methylene bis(4-isocyanatocyclohexane), adipic acid, isophthalic acid, and 1,4-butane diol. As supplied, the urethane resin had been compounded with a weathering stabilizer system. Extrusion and laminating conditions were the same as in Example 1 except as noted below.

| Extrusion conditions: | |
| --- | --- |
| Extruder | 4.4 cm |
| Die | 35.6 cm |
| Extruder temp zones | 171°, 177°, 182°, 193° C. |
| Die temp | 193° C. |
| Film takeaway speed | 10 m/min. |
| Film caliper thickness | 50 micrometers |
| Laminating conditions: | |
| Hot can | 154° C. |
| Speed | 11.3 m/min. |

EXAMPLE 4

Covered retroreflective sheeting was prepared as in Example 1 except that the microsphere-containing surface of the retroreflecting base material 18 had been imprinted with a polyvinyl chloride-based rotogravure ink design.

The PET carrier was not removed but rather wound up in the storage roll still attached to the composite. Then the entire storage roll was heat treated in an air circulating oven for 16 hours at 93° C. After cooling, the PET carrier was removed and the completed composite was again wound up for storage.

EXAMPLE 5

Covered retroreflective sheeting was prepared as in Example 1 except that the transparent cover film 10 was an extruded HMW polymer comprising a blend of two stabilized copolymeric EAA resins, namely, a blend of 80 parts of the "Primacor" 1420 used in Example 1 and 20 parts of "Primacor" 5980. The latter has a melt index of 300 and is a copolymer of 80 parts of ethylene and 20 parts of acrylic acid. This resulted in an equivalent acid level of 11.2% for the blend. In the laminating procedure, the corona treaters were not used, but inseparable adhesion was attained.

EXAMPLE 6

Covered retroreflective sheeting was prepared as in Example 1 except that the retroreflecting base material was that of FIG. 3 of the drawing.

TESTING

Simulated Weathering Resistance

Retroreflective sheetings of some of the examples were tested for weatherability in a weatherometer for 1000 hours under ASTM Test Method G23 Condition E with results as follows:

| Example | Retention of retroreflectivity | Yellowing | Cracking |
|---|---|---|---|
| 1 | 69% | None | None |
| 2 | 82% | None | None |
| 3 | 72% | None | None |

Tensile and Elongation

The tensile strength and total elongation of some of the retroreflective sheetings of the examples were tested under ASTM Test Method D882-80a. Results are reported in Table A.

Impact Resistance

Tested at 25° C. according to ASTM D2794-82 using a 0.6 mm thickness aluminum panel to which the retroreflective sheeting is attached. The indentation is in extrusion direction, and the punch has a diameter of 15.9 mm. The test is carried to the machine limit of 1.85 kg-m. Results are reported in Table A.

Reflective Brilliance

Retroreflective Brilliance is measured at 0.2° divergence angle and −4° entrance angle in candellas per lumen using the retroluminometer described in United States defensive publication T987,003. Results are reported in Table B.

License Plate Embossibility

With the retroreflecting material mounted on a license plate blank having a thickness of 0.8 mm, a variable embossing pattern is impressed using a male/female mold to form a series of six zeros 7.7 cm high and 3.1 cm across and a stroke width of 0.7 cm. The zeros emboss the blank to depths of 1.3 mm, 1.5 mm, 1.8 mm, 2.0 mm, 2.3 mm, 2.5 mm. The slope of the edges of each embossed character varies from 0.35 at 1.3 mm depth to 0.7 at 2.5 mm depth. Embossing depth reported as greatest depth of embossing where no visible cracking is evident. Results are listed in Table B.

Cover Film Adhesion

Retroreflective sheeting is applied to a 1.3-mm aluminum panel, and a sharp razor blade is used to carefully start peeling the cover film away from the base reflective sheeting. Tensile force for peeling the cover film away from the base reflective sheeting is measured on an Instron tensile testing machine, pulling the cover film away from the base sheeting at a 90° angle. Results are in Table B.

TABLE A

| Example | Yield tensile (MPa) | Break tensile (MPa) | Elongation (%) | Impact Resistance Kg-m |
|---|---|---|---|---|
| 1 | 6.1 | 9.0 | 225 | NF |
| 2 | 7.3 | 10.3 | 270 | NF |
| 3 | 3.2 | 19.8 | 565 | NF |
| 4 | 6.1 | 9.0 | 230 | NF |
| 5 | 4.5 | 7.1 | 200 | NF |

NF = no failure

TABLE B

| Example | Reflective Brilliance (candellas per lumen) | License Plate Embossibility (mm) | Cover Film Adhesion (initial) (g/cm width) | Cover Film Adhesion (after 16 hr. at 93° C.) |
|---|---|---|---|---|
| 1 | 68 | 2.5 | Inseparable | — |
| 2 | 79 | 2.5 | Inseparable | — |
| 3 | 70 | 2.5 | 910 | — |
| 4 | — | 2.5 | 180** | Inseparable** |
| 5 | 74 | 2.5 | Inseparable | — |
| 6 | 108 | 2.5* | 450 | Inseparable |

*The underlying retroreflecting base material cracked, but not the transparent film cover.
**Measurements taken in printed areas.

Although the cover film applied according to the invention often completes the optics of the retroreflective sheeting, i.e., results in incident light rays being focused by the lenses onto the underlying specularly reflective layer, it is not necessary for the cover film to complete the optics. For example, in some embodiments of the invention, the cover film is too thin to complete the optics, and a second layer is later applied over the cover film for that purpose. Such a second layer can be applied by dip-coating procedures such as commonly used for completing license plate products.

I claim:

1. Enclosed-lens retroreflective sheeting comprising substantially a monolayer of lenses anchored in a binder layer, a specularly reflective layer underlying and spaced from the lenses by transparent material, and a weather-resistant, transparent cover film, wherein the improvement comprises:
    the cover film comprises extruded, substantially thermoplastic polymer and has an elongation of at least 50% and a tensile relaxation force from 50% elongation after 5 minutes relaxation of no more than 2300 N/m width.

2. Retroreflective sheeting as defined in claim 1 wherein the cover film has an elongation of at least 100% and a tensile relaxation force of less than 1000 N/m width.

3. Retroreflective sheeting as defined in claim 2 wherein the elongation is at least 200% and the tensile relaxation force is less than 700 N/m width.

4. Retroreflective sheeting as defined in claim 1 wherein the melt index of the polymer is no greater than 300.

5. Retroreflective sheeting as defined in claim 1 wherein the polymer is selected from (a) one or more aliphatic urethanes or (b) one or more copolymers of monomers comprising by weight a major proportion of at least one of ethylene and propylene and a minor proportion of another monomer.

6. Retroreflective sheeting as defined in claim 5 wherein the polymer is a copolymer (b), and said another monomer is at least one of acrylic acid, methacrylic acid, and vinyl acetate.

7. Retroreflective sheeting as defined in claim 5 wherein said cover film comprises a dual-layer composite, each layer being a copolymer (b), the inner layer being a nonionomeric copolymer and the outer, an ionomeric copolymer.

8. Enclosed-lens retroreflective sheeting comprising substantially a monolayer of lenses anchored in a binder layer, a specularly reflective layer underlying and spaced from the lenses by thermoset transparent material, and a weather-resistant transparent cover film, wherein the improvement comprises:
the cover film comprises substantially thermoplastic polymer selected from (a) one or more aliphatic urethanes or (b) one or more copolymers of monomers comprising by weight a major proportion of at least one of ethylene and propylene and a minor proportion of another monomer.

9. Retroreflective sheeting as defined in claim 8 wherein said polymer is a copolymer (b), and said another monomer is at least one of acrylic acid, methacrylic acid, and vinyl acetate.

10. Method of providing retroreflecting base material with a soft, tough, weather-resistant, transparent cover film comprising the steps of (1) extruding a cover film comprising substantially thermoplastic polymer, which cover film has an elongation of at least 50% and a tensile relaxation force from 50% elongation after 5 minutes relaxation of no more than 2300 N/m width, and (2) contacting the extruded cover film to the retroreflecting base material under heat and pressure to provide retroreflective sheeting.

11. Method as defined in claim 10 wherein the cover film has an elongation of at least 100%, and a tensile relaxation force from 50% elongation after 5 minutes relaxation of no more than 1000 N/m width.

12. Method as defined in claim 11 wherein the retroreflecting base material is adhered to a license plate blank.

13. Method as defined in claim 10 wherein the polymer is one or more copolymers of monomers comprising by weight a major proportion of at least one of ethylene and propylene and a minor proportion of another monomer.

14. Method as defined in claim 10 wherein the polymer is one or more aliphatic urethanes.

15. Method of providing retroreflecting base material with a soft, tough, weather-resistant, transparent cover film comprising the steps of (1) forming a transparent cover film which comprises substantially thermoplastic polymer selected from (a) one or more aliphatic urethanes and (b) one or more copolymers of monomers comprising by weight a major proportion of at least one of ethylene and propylene and a minor proportion of another monomer and (2) contacting the transparent film to the retroreflecting base material under heat and pressure to provide retroreflective sheeting.

16. Method as defined in claim 15 wherein the cover film has an elongation of at least 100%, and a tensile relaxation force from 50% elongation after 5 minutes relaxation of no more than 1000 N/m width.

* * * * *